United States Patent [19]

Davis et al.

[11] Patent Number: 5,177,685
[45] Date of Patent: Jan. 5, 1993

[54] AUTOMOBILE NAVIGATION SYSTEM USING REAL TIME SPOKEN DRIVING INSTRUCTIONS

[75] Inventors: James R. Davis, North Cambridge; Christopher M. Schmandt, Milton, both of Mass.

[73] Assignee: Massachusetts Institute of Technology, Cambridge, Mass.

[21] Appl. No.: 565,274

[22] Filed: Aug. 9, 1990

[51] Int. Cl.⁵ ............................................. G01C 21/00
[52] U.S. Cl. .................................. 364/443; 340/988; 364/449; 364/453
[58] Field of Search ............... 340/988, 989, 990, 995; 364/443, 444, 449, 450, 453, 436

[56] References Cited

U.S. PATENT DOCUMENTS

| | | | |
|---|---|---|---|
| 4,139,889 | 2/1979 | Ingels | 340/989 X |
| 4,697,281 | 9/1987 | O'Sullivan | 455/33 X |
| 4,734,863 | 3/1988 | Honey et al. | 340/988 X |
| 4,796,191 | 1/1989 | Honey et al. | 364/450 |
| 4,812,843 | 3/1989 | Champion. III et al. | 340/989 X |
| 4,882,696 | 11/1989 | Nimura et al. | |
| 4,891,761 | 1/1990 | Gray et al. | 364/449 X |
| 4,926,336 | 5/1990 | Yamada | 364/444 |

(List continued on next page.)

OTHER PUBLICATIONS

"Synthetic Speech for Real Time Direction-Giving", C. M. Schmandt et al., Digest of Technical Papers, International Conference on Consumer Electronics, Rosemont, Ill., Jun. 6-9, 1989.

"Synthetic Speech for Real Time Direction Giving", C. M. Schmandt et al., IEEE Transactions on Consumer Electronics, 35(3):649-653, Aug. 1989.

"The Back Seat Driver: Real Time Spoken Driving Instructions", J. R. Davis et al., Proceedings of the IEEE Vehicle Navigation and Information Systems Conference, Toronto, Canada, Sep. 1989.

"Back Seat Driver: Voice Assisted Automobile Navigation", by J. R. Davis, Ph.D. Thesis, Massachusetts Institute of Technology, Sep., 1989.

"CD-ROM Assisted Navigation Systems", by O. Ono et al., Digest of Technical Papers, IEEE International Conference on Consumer Electronics, Rosemont, Ill., Jun. 8-10, 1988.

"Attention, Intentions, and the Structure of Discourse", by B. J. Grosz and C. L. Sidner (Computational Linguistics, 12(3):175-204, 1986.

"The Intonational Structuring of Discourse", by J. Hirschberg et al., Proceedings of the Association for Computational Linguistics, 136-144, Jul. 1986.

Automobile Electronic News, vol. 1, No. 16., "U.K. Picks GEC to Head Navigation Project", by James Fallon, Aug. 28, 1989.

"Softening of the Arteries", by Bruce Weber, The New York Times Magazine, p. 78, Aug. 26, 1990.

"Terminal Back Seat Driver", Technology Review, Jul., 1990, p. 10.

(List continued on next page.)

Primary Examiner—Parshotam S. Lall
Assistant Examiner—Edward Pipala
Attorney, Agent, or Firm—Choate, Hall & Stewart

[57] ABSTRACT

An automobile navigation system which provides spoken instructions to the driver of an automobile to guide the driver along a route is disclosed. The heart of the system is a computing apparatus comprising a map database, route finding algorithms, a vehicle location system, discourse generating programs, and speech generating programs. Driver input means allows the driver to enter information such as a desired destination. The route finding algorithms in the computer apparatus calculate a route to the destination. The vehicle location system accepts input from a position sensor which measures automobile movement (magnitude and direction) continuously, and using this data in conjunction with the map database, determines the position of the automobile. Based on the current position of the automobile and the route, the discourse generating programs compose driving instructions and other messages according to a discourse model in real time as they are needed. The instructions and messages are sent to voice generating apparatus which conveys them to the driver.

58 Claims, 3 Drawing Sheets

U.S. PATENT DOCUMENTS

| | | |
|---|---|---|
| 4,937,751 | 6/1990 | Nimura et al. ............... 364/444 X |
| 4,939,662 | 7/1990 | Nimura et al. ............... 340/990 X |
| 4,951,211 | 8/1990 | De Villeroche ............... 364/444 |
| 4,954,958 | 9/1990 | Savage et al. ............... 364/444 |
| 4,984,168 | 1/1991 | Neukrichner et al. ............... 364/449 |
| 4,992,947 | 2/1991 | Nimura et al. ............... 364/444 |
| 5,021,961 | 6/1991 | Ross et al. ............... 340/990 X |
| 5,041,983 | 8/1991 | Nakahara et al. ............... 364/449 |
| 5,043,902 | 8/1991 | Yokoyama et al. ............... 364/449 |

OTHER PUBLICATIONS

"Taxi! Dynamic Cartographic Software for Training Cab Drivers", by M. Bosworth et al., Technical Report, Hunter College Department of Geology and Geography, (212)-772-4000, 1988 paper presented at the Annual Meeting of the Association of American Geographers.

"Digital Map Dependent Functions of Automatic Vehicle Location Systems", by C. B. Harris et al., IEEE Position and Location Symposium, pp. 79-87, 1988, IEEE CH2675-7.

"Digital Maps on Compact Discs", by H. J. G. M. Benning, Technical Paper Series 860125, Society of Automobile Engineers, 1986.

"Eva: An Electronic Traffic Pilot for Motorists", by O. Pilsak, Technical Papers Series 860346, Society of Automotive Engineers, 1986.

"Digital Map Data Bases for Autonomous Vehicle Navigation Systems", by E. P. Neukirchner et al., IEEE Position and Location Symposium, pp. 320-324, 1986, IEEE 86CH2365-5.

"Applications of the Compact Disc in Car Information and Navigation Systems", by M. L. G. Thoone et al., Technical Papers Series 840156, Society of Automotive Engineers, 1984.

"On Board Computer System for Navigation, Orientation, and Route Optimization", by P. Haeussermann, Technical Paper Series 840483, Society of Automotive Engineers, 1984.

"Electro Gryo-Cator: New Inertial Navigation System for Use in Automobiles", by K. Tagami et al., Technical Paper Series 830659, Soc. of Automotive Engineers, 1983.

"Navigation Systems Using gps for Vehicles", by T. Itoh, et al., Technical Paper Series 861360, Society of Automotive Engineers, 1986.

"Extending Low Cost Land Navigation Into Systems Information Distribution and Control", by S. K. Honey et al., IEEE Position and Locations Symposium, pp. 439-444, 1986, IEEE 86CH2365-5.

"Map Matching Augmented Dead Reckoning", by W. B. Zavoli et al., Proceedings of the 35th IEEE Vehicular Technology Conference, pp. 359-444, 1986, IEEE CH2308-5.

"Automated Provision of Navigation Assistance to Drivers", by Matthew McGranaghan et al., The American cartographer 14(2):121-138, 1987.

AUTOMOBILE NAVIGATION SYSTEM USING REAL TIME SPOKEN DRIVING INSTRUCTIONS

BACKGROUND OF THE INVENTION

This invention relates to computerized automobile navigation systems, particularly to a system which calculates a route to a destination, tracks automobile location, and provides spoken instructions to the driver in real time as they are needed.

Navigation systems can be classified into three categories:
- Positioning systems tell you where you are.
- Orienting systems show the direction of your destination.
- Instructional systems tell you what to do to get to your destination.

A navigation system can provide one, two, or all of these services. Navigation systems can be further distinquished by how they provide the information:
- Verbal systems speak.
- Textual systems provide text.
- Graphic systems provide pictures.

Finally, systems can be classified as either real time or static. The categories of this classification are not independent. There can be no static positioning system, since one cannot predict the future position of an automobile.

There are several problems with static navigation systems. First, they do not help the driver follow the route. The driver must determine when to apply each instruction. A second problem is that since the instructions must be specified in advance, there is little to be done if the driver does not follow the instructions, which might happen from error, or because the instructions are wrong, or simply ill-advised (as when confronting a traffic jam).

Previous automobile navigation systems have used text or graphics to give navigation information. However, there are several disadvantages to presenting information visually. First, the driver must look at a display while driving, which makes driving less safe. For providing driving directions, visual displays are most easily used when they are least needed. Second, with respect to graphic displays, many people have difficulty using maps, making this mode of providing information undesirable. However, if speech is used, the driver's eyes are left free for driving. In addition, speech uses words, and can therefore refer to past and future actions and objects not yet seen. This is hard to do with symbolic displays or maps.

There is clearly a need for an instructional, verbal, real time automobile navigation system which can guide a driver to a destination much as a passanger familiar with the route would. The present invention meets that need.

SUMMARY OF THE INVENTION

The present invention, called the "Back Seat Driver", is a computer navigation system which gives spoken instructions to the driver of an automobile to guide the driver to a desired destination. Computing apparatus, installed either in the automobile or accessed through a cellular car phone, contains a map database and a route finding algorithm. A vehicle location system uses data from a position sensor installed in the automobile to track the location of the automobile. Discourse generating programs compose driving instructions and other messages which are communicated to the driver using voice generating apparatus as the driver proceeds along the route.

The important differences between The Back Seat Driver and other such systems are that the Back Seat Driver finds routes for the driver, instead of simply displaying position on a map, tells the driver how to follow the route, step by step, instead of just showing the route, and speaks its instructions, instead of displaying them. Each of these design goals has required new features in the programs or in the street map database.

The street map database of the Back Seat Driver distinguishes between physical connectivity (how pieces of pavement connect) and legal connectivity (whether one can legally drive onto a physically connected piece of pavement). Legal connectivity is essential for route finding, and physical connectivity for describing the route.

To find the fastest routes, the map database of the Back Seat Driver includes features that affect speed of travel, including street quality, speed limit, traffic lights and stop signs. To generate directions, the map includes landmarks such as traffic lights and buildings, and additional descriptive information about the street segments, including street type, number of lanes, turn restrictions, street quality, and speed limit. The map also preferably includes other features, such as time-dependent legal connectivity, and expected rate of travel along streets and across intersections. Positions are preferably stored in the map database in three dimensions, not two, with sufficient accuracy that the headings of the streets can be accurately determined from the map segments.

Driving instructions generated by the Back Seat Driver are modeled after those given by people. The two issues for spoken directions are what to say (content) and when to say it (timing). The content of the instructions tells the driver what to do and where to do it. The Back Seat Driver has a large taxonomy of intersection types, and chooses verbs to indicate the kind of intersection and the way of moving through it. The instructions refer to landmarks and timing to tell the driver when to act.

Timing is critical because speech is transient. The Back Seat Driver gives instructions just in time for the driver to take the required action, and thus the driver need not remember the instruction or exert effort looking for the place to act. The Back Seat Driver also gives instructions in advance, if time allows, and the driver may request additional instructions at any time. If the driver makes a mistake, the Back Seat Driver describes the mistake, without casting blame, then finds a new route from the current location.

Giving instructions for following a route requires breaking the route down into a sequence of driving acts, and knowing when an act is obvious to the driver and when it needs to be mentioned. This further requires knowledge about the individual driver, for what is obvious to one may no be so to another. The Back Seat Driver preferably stores knowledge of its users, and uses this knowledge to customize its instructions to the preferences of the users.

Speech, especially synthetic speech, as an output media imposes constraints on the interface. The transient nature of speech requires that utterances be repeatable on demand. The Back Seat Driver has the ability to construct a new utterance with the same intent, but not necessarily the same words, as a previous message.

Synthetic speech being sometimes hard to understand, the Back Seat Driver chooses its words to provide redundancy in its utteranaces.

An actual working prototype of the Back Seat Driver has been implemented. It has successfully guided drivers unfamiliar with Cambridge. Mass. to their destinations. It is easy to foresee a practical implementation in the future.

DESCRIPTION OF THE PREFERRED EMBODIMENT

Figure 1:
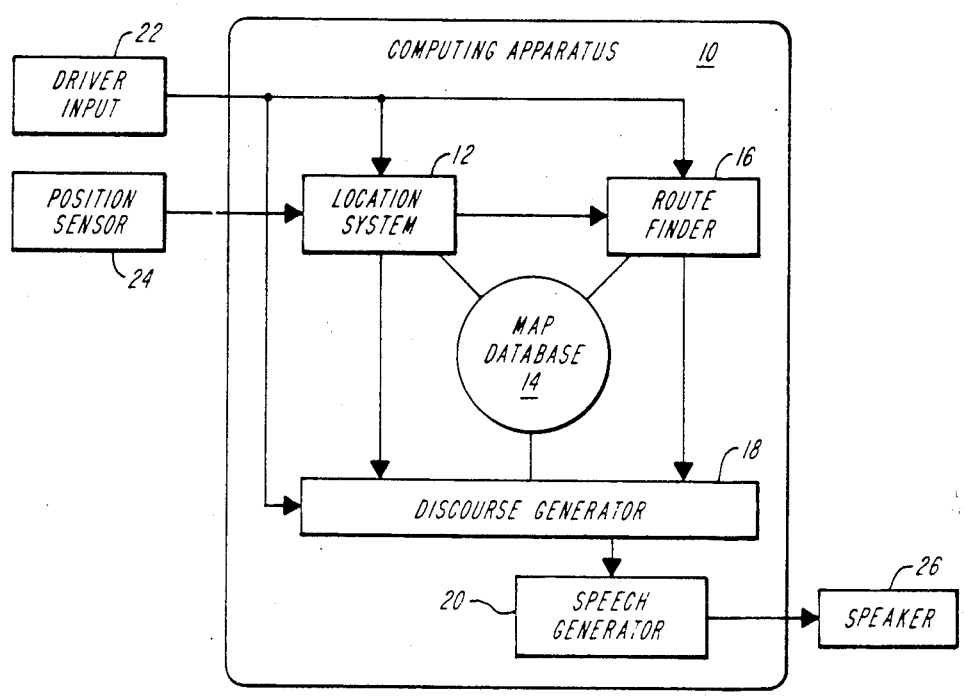
FIG. 1 illustrates schematically the basic functional components of the Back Seat Driver in its preferred embodiment.

The automobile navigation system according to the present invention is illustrated schematically in FIG. 1. The heart of the system is a computing apparatus 10 comprising a vehicle location system 12, a map database 14, a route finder 16, a discourse generator 18, and a speech generator 20. Driver input means 22 allows the driver to input to the computing apparatus 10 information such as a desired destination. A position sensor 24 measures automobile movement (magnitude and direction) and sends data to the location system 12 which tracks the position of the automobile on the map. The route finder 16 calculates a route to the destination. Based on the current position of the automobile and the route, the discourse generator 18 composes driving instructions and other messages according to a discourse model in real time as they are needed. The instructions and messages are sent to the speech generator 20 which conveys them to the driver by means of a speaker system 26. The speaker system may be that of the car's radio.

In FIG. 1, the computing apparatus is illustrated as a single entity. However, in other embodiments, the components may not all be implemented in the same piece of apparatus. For example, in one working prototype of the Back Seat Driver, the main computing apparatus is a Symbolics Lisp machine, but the location system is implemented separately by an NEC location system that tracks the position of the automobile using its own map database, and the speech generator is implemented separately by a Dectalk speech synthesizer. In another working prototype, the main computing apparatus is a Sun Sparc workstation. The map database for the Back Seat Driver can be provided on a CD-ROM, a floppy disk, or stored in solid-state memory, for example.

The components of the system and the system processes which coordinate their performance, particularly as embodied in the working prototypes, are discussed in the sections which follow. Aspects of the invention are also described in the following sources, which are hereby incorporated by reference:

1. "Synthetic speech for real time direction-giving," by C. M. Schmandt and J. R. Davis, *Digest of Technical Papers, International Conference on Consumer Electronics*, Rosemont, Ill., Jun. 6-9, 1989.
2. "Synthetic speech for real time direction-giving," by C. M. Schmandt and J. R. Davis, *IEEE Transactions on Consumer Electronics*, 35(3): 649-653, August 1989.
3. "The Back Seat Driver: Real time spoken driving instructions," by J. R. Davis and C. M. Schmandt, *Proceedings of the IEEE Vehicle Navigation and Information Systems Conference*, Toronto, Canada, September 1989.
4. "Back Seat Driver: Voice assisted automobile navigation," by J. R. Davis, Ph.D. thesis, Massachusetts Institute of Technology, September 1989.

MAP DATABASE

The map database for the Back Seat Driver in the working prototypes originated as a DIME (Dual Indepedent Map Encoding) file, a map format invented by the U.S. Census Bureau for the 1980 census. Implementing the Back Seat Driver required extending the DIME map format in a number of ways to make it useful for route finding and route describing.

The basic unit of the DIME file is the segment. A segment is a portion of a street (or other linear feature such as a railroad, property line, or shoreline) chosen to be small enough that it is a straight line and has no intersection with any other segment except at its endpoints.

The two endpoints of a segment are designated FROM and TO. If the segment is a street segment (as opposed to, say, a railroad) and has addresses on it, then the FROM endpoint is the one with the lowest address. Otherwise, the endpoint labels are chosen arbitrarily. A segment has two sides, left and right. The sides are chosen with respect to travel from the FROM endpoint to the TO endpoint. A navigator using a DIME file can find the location of an address along the segment by interpolating the addresses between the low and high addresses for the two endpoints. The DIME file is suited to determining the approximate position of a building from its street address.

Attributes of a DIME file segment include: its name (40 characters), its type (a one to four character abbreviation such as "ST"), the ZIP code for each side, and the addresses for each endpoint and each side. At each endpoint of a segment is a pointer to a node. A node represents the coordinates of that endpoint and the set of other segments which are physically connected at that endpoint. Segments share nodes. If any two segments have an endpoint at the same coordinate, they will both use the same node for that endpoint.

A vehicle navigation system using a DIME file can represent the position of a vehicle on the map by a structure called a position. A position has three parts: a segment, an orientation, and a distance. The segment is one of the segments from the map database, the orientation specifies the direction the vehicle is travelling (towards the TO or FROM endpoint), and the distance is the distance from the FROM endpoint of the segment, no matter which way the vehicle is oriented. When travelling towards the TO endpoint of the segment, distance increases, when travelling towards the FROM endpoint, it decreases.

The DIME file is not adequate for routing finding and is only marginal for generating route descriptions. The most important problem with the DIME format is that it indicates only if two segments are physically connected (that is, if they touch), but not whether they are legally connected (i.e. whether it is legal to travel from one to the other). Legal connectivity is crucial for route finding. However, legal connectivity does not replace physical connectivity; route description requires information about physical connections as well. Physical connectivity also affects route finding directly when seeking the simplest route, since ease of description is determined in part by physical connectivity.

The most significant extension of the DIME file format required for its use in a vehicle navigation system is the explicit representation of legal connectivity. This can be accomplished by adding a legal connection list at each endpoint of a segment to indicate all segments which are legally accessible from that endpoint. This allows the route finder to consider only legal paths. To the inventor's knowledge, this has not been included in any other navigation system.

Another problem with the DIME file is that it is a planar graph. This means that no two segments can cross except at an intersection, so there is no way to correctly represent an overpass, for example. The DIME format represents an overpass by breaking both streets at the point where they cross, and creating a fictitious intersection even though the segments do not touch in reality. These false intersections are particularly troublesome since DIME does not represent legal connectivity, so it appears possbile and legal for a car to jump straight up and turn onto the overpass.

Points in the map database for a vehicle navigation system are therefore preferably three-dimensional. Route descriptions then provide better knowledge of the underlying topography. Stopping distance is affected by slope, so instructions must be given sooner when traveling down a hill. Slope affects safety. The route finder should avoid steep slopes in snowy weather. Finally, distance between points will be more accurate when change in altitude is considered. Roads designed for high speed may be more level than the underlying topography. They may be elevated or they may be depressed. A road which is not at grade will not have the slope of the land beneath it.

Coordinates in the DIME file are stored in ten thousandths of a degree. This means that the position of an endpoint in the map differs form the true position by as much as 6.5 meters in latitude and 5 meters in longitude at the latitude of Boston. This inherent position error causes problems because it introduces error in length and in heading. Uncertainty in heading causes uncertainty in the angle between two segments. A straight street can appear to wobble if it is made of many short segments. Segment "wobble" causes problems for a route finder, makes it hard to generate correct descriptions, and interferes with position determination.

DIME file segment "wobble" can be corrected for by assuming that the angle between two streets is the smallest possible value. However, this sometimes overestimates the speed an intersection can be travelled through. Uncertainty in the angle of segments at an intersection also makes it difficult to describe the intersection correctly and interferes with navigation because it makes it difficult to compare compass headings with the heading of a street.

A richer taxonomy of street types than that provided by DIME is preferable for a vehicle navigation system. Important categories of streets are: ordinary street, rotary, access ramp, underpass, tunnel, and bridge. Preferably, non-streets such as railroad, water, alley and walkway are also included.

The DIME file records a small amount of information about each segment. For a vehicle navigation system, additional attributes are preferably added to make better descriptions. Important additional attributes are street quality, divided roads, signs, traffic lights, stop signs, buildings, other landmarks, lane information, and speed limit.

The street quality can be, for example, a number from 1 ("super") to 4 ("bad") which combines the ease of locating and following the street and the expected rate of travel along it. The street quality attribute should be used by both the route finder and the route describer.

The identification of divided roads is necessary to avoid U Turns where they are not possible, although it is preferable to make U Turns only if there is no other alternative. In addition, the route finder should recognize that a divided road is safer than an undivided road.

Sign and exit numbers are preferably stored in the map database as connection cues, which are text strings that give cues for moving from one segment to another. Every cue has a type which tells the kind of cue, e.g. sign or exit-number. There may be more than one connection cue for a given pair of segments, but there should never be more than one of a type.

The most useful landmarks are traffic lights. Traffic lights are preferably stored independently for each endpoint of each segment, since the presence of a light at one segment of an intersection does not imply that all other segments at the intersection have a light.

Two types of buildings which are especially useful as landmarks are toll booths and gas stations. Toll booths can be stored as connection cues. Gas stations can be stored in the services database described below. However, a preferred approach is to index gas stations (and other buildings) by street.

Roads often have more than one lane. Selecting the proper lane can make travel faster, and it may even be mandatory, since certain turns may only be possible from some lanes. The map database therefore preferably contains the number of lanes for both directions on a segment, and whether one or more lanes is reserved for turn restrictions.

The map database also preferably includes time dependent legal connectivity. Sometimes a given turn will be prohibited at certain hours of the day, typically rush hour. Additionally, lanes sometimes switch direction during the day to accomodate rush hour traffic, and some lanes are reserved for carpools during rush hour.

The expected rate of travel is not necessarily a function of street quality. Although there is a correlation, travel rate is preferably a separate segment attribute. One reason is that travel rate, unlike quality, changes during the day. A model of traffic flow like that of an experienced driver (i.e. it should know what "rush hour" means) is preferably implemented in the map database.

Some turns, though legal, are difficult to make. The route finder preferably avoids these turns if possible. To an extent, the difficulty of a turn is implicit in the quality of the participating street segments, but an explicit model in the map database is preferred.

Some lanes or streets are restricted to certain kinds of traffic (car pools, no commerical vehicles). Also important are height restrictions, since some underpasses are so low that tall vehicles will not fit under them. This information is preferably included in the map database.

At some lights it is permitted to make a right turn at a red light after a full stop. Right turns here will be no slower than rights turns at a stop sign, so the route finder should prefer such intersections to those that do not permit it. Also, traffic lights have differing cycle lengths. The map database preferably includes this information.

Local knowledge is also preferably included in the map database. These are facts about how people and institutions act on or near the road; e.g. that a speed trap is here, or that this road is one of the first ones plowed after a snow storm.

The Back Seat Driver should allow the driver to select famous destinations by name in addition to address by including this information in a database, and this database should be integrated with the services database, discussed below. The Back Seat Driver should also support names of buildings and office plazas made up by developers without reference to the street names.

Service locations are preferably stored in a services database. This database lists services such as gas stations, automatic teller machines and stores. For each service is recorded the name of the establishment, the address, phone number, and hours of operation. This allows the Back Seat Driver to select the closest provider of a service known to be open. The database can also be used as a source of landmarks when giving directions.

The map database preferably contains information on the division of the city into neighborhoods. This is useful for selecting an address. The postal ZIP code is not good for classifying neighborhoods.

Pronunciation information is preferably stored in a database for those place names which are easily mispronounced by the speech synthesizer. It would also be desirable to record which of those names have unusual spellings. This would allow the system to warn the driver to be alert for signs that might otherwise surprise her. Note that the driver only hears the name of a street, and has to guess how it is spelled from the sound she hears.

Abbreviations are preferably included to allow the user to enter certain street names in abbreviated form. A second use for abbreviations is to supply alternate spellings for streets, for example, to allow the driver to spell "Mt Auburn" as "Mount Auburn".

An almanac is preferably included to list the time of sunrise and sunset for the city. Arrangements can be made to either purchase this database or locate a program which an calculate it, for arbitrary position and date.

A problem for a practical Back Seat Driver is how to keep the map database accurate, since the streets network is constantly changing. Over time, new street are constructed, old streets are renamed or closed. These kinds of changes are predictable, slow, and long lasting. Other changes are unpredictable, quick, and transient. A road may be closed for repairs for the day, blocked by a fallen tree, or full of snow. Such changes are usually short lived. Thus, the Back Seat Driver needs the ability to change legal connectivity dynamically. In addition, the route finder should preferably have the ability to avoid congested roads caused by rush hour or accidents, for example. The map database is therefore preferably continuously updated by some form of radio broadcast by an agency that monitors construction and real time traffic conditions.

The Census Bureau, in cooperation with the United States Geological Survey, has designed a new map format known as TIGER (Topologically Integrated Geographic Encoding and Referencing) which has several improvements over the DIME format, but which is still a planar graph representing only physical connectivity. The map database for a Back Seat Driver could be also be originated from a TIGER file as long as the extensions discussed above were implemented.

Figure 3:
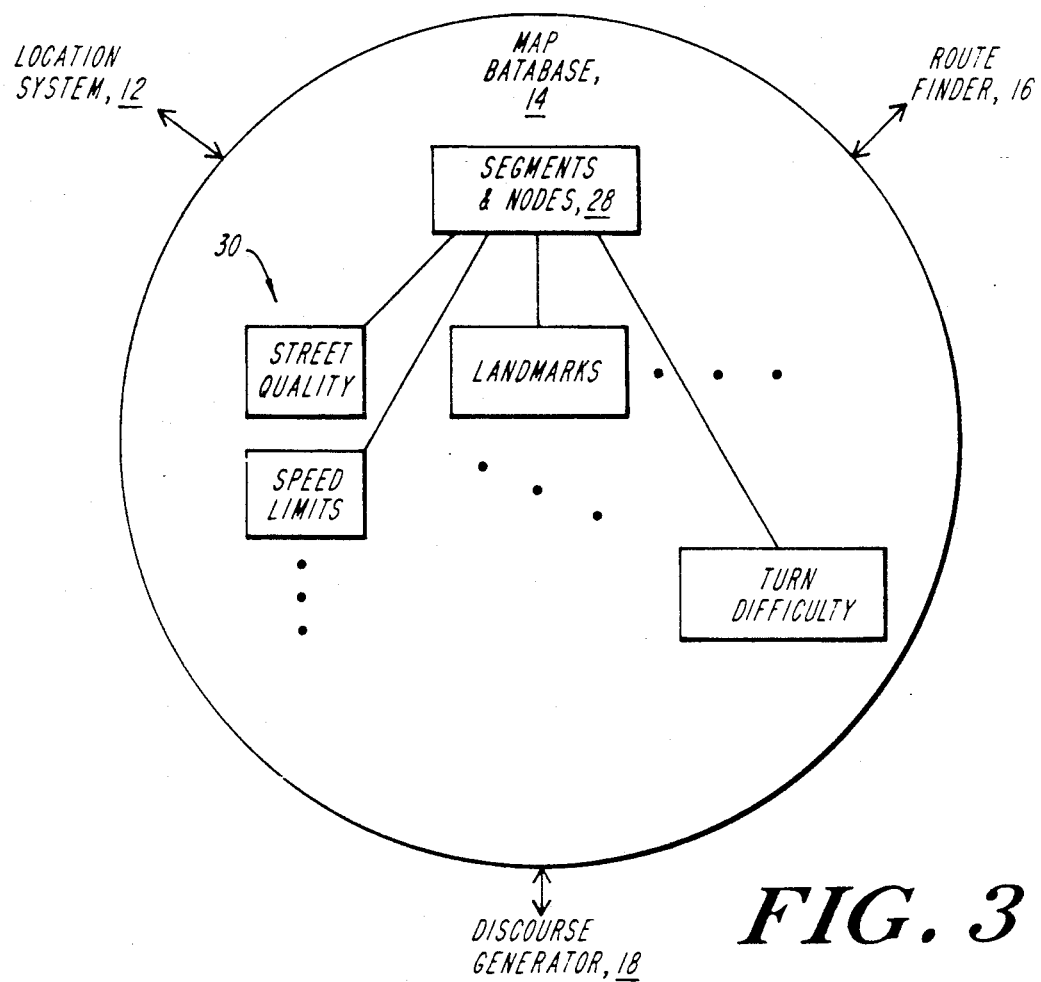
FIG. 3 is a schematic illustration of the map database.

The map database is shown schematically in FIG. 3. In the preferred embodiment, the map database 14 includes, as its basis, a file 28 of segments and nodes. File 28 may be an original file or may be adapted from a DIME file or a TIGER file by adding the above-described extensions. In addition, the map database 14 may include optional features 30, as described above.

ROUTE FINDER

Finding a route between two points in a street network is an example of searching a general graph. The task is to find a sequence of segments that lead from the origin to the destination. There are usually a great many distinct ways of getting from one place in the city to another, some better than others. Graph search algorithms differ in the quality of the solution they find and the time they require. The Back Seat Driver requires an algorithm that finds a good route in a short time.

The route finder of the working prototypes of the Back Seat Driver is based on an A* search algorithm. The A* algorithm is a form of best-first search, which itself is a form of breadth-first search. These searching techniques are well-known and are described in detail in Davis, 1989, cited above.

In a breadth-first search, a tree of all possible decisions is divided into levels, where the first level actions are those leading from the root, the second level actions are those that come from situations after first level actions, and so on. All actions at a given level are considered before any at the next higher level. While the breadth-first search is operating, it maintains a list of all possible partial routes and systematically examines every possible path from the end of every partial route to compile a new list of partial routes. This search procedure finds the path with the fewest segments. However, this is not necessarily the best path. To be sure of finding the best path, the search cannot stop when the first path is found, but must continue, expanding each path, until all paths are complete. This is not at all desirable, since there could be (and in fact will be) many paths.

The best-first algorithm solves this problem by keeping track of the (partial) cost of each path, and examining the one with the smallest cost so far. This requires a function that can compare two routes and produce a numeric rating. Such a function is called a metric. To further reduce the cost of searching, before adding a segment to a path, the best-first search checks to see whether it is a member of any other path. If it is, it is not added, for presence on the other path means that the other path was a less expensive way of reaching the same segment.

Best-first search finds the best solution and requires less time than exhaustive breadth-first search, but it still must consider partial solutions with an initial low cost which prove expensive when complete. The A* algorithm avoids wasting time on such falsely promising solutions by including an estimate for the completed cost when selecting the next partial solution to work on. The cost estimate function is $f^*(r) = g^*(r) + h^*(r)$, where r is a route, $g^*(r)$ is the known cost of the partial route, and $h^*(r)$ is the estimate of the cost to go from the endpoint of the route to the goal. The $h^*$ function must have the property of being always non-negative and never over-estimating the remaining cost. An h* meeting these two conditions is said to be admissible. It should be obvious that if h* is chosen to be always zero, then A* search is just best-first search. In applying A* to finding routes on a map, h* is just the cartesian distance between the endpoint of the partial route and the destination point. It is certain that no route will be shorter than the straight line, so this estimate is never an over estimate. A* search is more efficient than best-first.

The A* algorithm finds the optimum route, but the Back Seat Driver might be better served with an algorithm that finds a reasonable route in less time. This is especially true when the vehicle is in motion. The longer the route finder takes, the greater the distance that must be reserved for route finding. As this distance becomes larger, it becomes harder to predict the future position of the car. This can be done by choosing an h* which multiplies the estimated distance remaining by a constant D. Setting D greater than one makes h* no longer admissible, since the estimate might exceed the actual cost by a factor of D. The resulting routes are no longer optimal, but are still pretty good. The effect is to make the algorithm reluctant to consider routes which initially lead away from the goal.

The route finder preferably uses a value of 2 for D. This yields the greatest increase in payoff. A possible improvement is to run the route finder twice, first with a high value of D to find an initial route in order to begin the trip, and then with a low D to search for a better route, using spare time while driving.

Preferably, three different metrics are used. The distance metric finds the shortest route, the speed metric finds the fastest route, and the ease metric finds the easiest route. The metric for distance is just the sum of the lengths of the component segments. The other two metrics are more complicated than the distance metric, because they must consider intersections as well as segments. In general there is a cost to travel along a segment and a cost to get from one segment to another. All costs are expressed as an "equivalent distance" which is the extra distance one would travel to avoid the cost.

The metric for speed estimates the cost for traveling along a segment by multiplying its length by a constant which depends upon the quality of the street. In principle, one could calculate expected time by dividing length by the average speed on the segment were this quantity available in the database. Examples of appropriate constants are:

| Quality | Factor |
|---------|--------|
| super   | 1      |
| good    | 1.2    |
| average | 1.5    |
| bad     | 2.0    |

All multiplicative constants must be greater than or equal to one to ensure that the cost of a route is never less than the straight line distance between two points. This condition is essential for the correct operation of the A* search algorithm, since the estimation function (g*) must always return an under-estimate.

The time to cross an intersection is preferably modeled by a mileage penalty which depends upon the nature of the intersection. Examples of appropriate penalties are:

| Factor | Cost | Reason |
|--------|------|--------|
| turn | ¼ mile | Must slow down to turn |
| left turn | ½ mile | May have to wait for turn across traffic flow |
| traffic light | ¼ mile | Might be red |

If the segment is one-way, the penalties should be cut in half, since there will be no opposing traffic flow. The turning penalties should be computed based only on the angle between two segments, not on the segment type or quality.

The metric for ease seeks to minimize the driver's effort in following the route. Again, driver's effort is the sum of the effort to travel along a segment and the effort to get from one segment to another. Travel along a segment depends upon its quality. Turns of every sort should be penalized equally, since they all require decisions. The intention of this metric is to find routes which require the least amount of speaking by the Back Seat Driver, leaving the driver free to concentrate on other matters.

If the driver leaves the route, the Back Seat Driver must immediately inform the driver and begin to plan a new route. Route planning after a mistake is no different from any other time, except that the vehicle is more likely to be moving. In the working prototypes, when the car is moving, the Back Seat Driver first estimates the distance the car will travel during the route finding process by multiplying the current velocity by the estimated time to find the route. Then it finds the position the driver will reach after traveling this distance, assuming that the driver will not make any turns without being told to do so. It then finds a route from this extrapolated position to the goal. Finally, it finds a route from the car's actual position to the estimated starting position. This second route is so short that the car is unlikely to move far during the time it is computed.

The route finder of the working prototypes estimates the time to find the route between two points by multiplying the distance between them by a constant. This constant was initially determined by running the route finder for 20 randomly selected pairs of origins and destinations. As the Back Seat Driver runs, it accumulates additional values for the constant.

A problem is how to reliably detect when the driver has left the route. With the extended DIME format of the working prototypes, if the driver turns into a gas station, for example, the system will believe, falsely, that the driver has turned onto some street, because the street map includes only streets, and not other paved areas such as parking lots and filling stations. From this false belief, the system will conclude that the driver has made a mistake. However, this problem can be solved by increasing the detail of the map.

Sometimes the driver will choose to not follow a route for good reasons that the Back Seat Driver is unaware of, perhaps because the road is blocked or because of a traffic jam. For the first case, the driver should be provided an "I Can't Do It" button or other means to inform the Back Seat Driver that the road is (temporarily) blocked. Once informed, the Back Seat Driver must automatically find a new route. For the second case, the driver's only recourse is to cancel the current trip (by pushing another button, for example), and, once out of the situation, re-request a route to the original destination. It is essential, though, that the driver either notify the Back Seat Driver of the impossibility of the requested action or cancel the trip, because otherwise the Back Seat Driver will treat the deviation from the route as a mistake, and continue to attempt to find a new route, which may very well lead back through the street the driver is trying to avoid.

Figure 4:
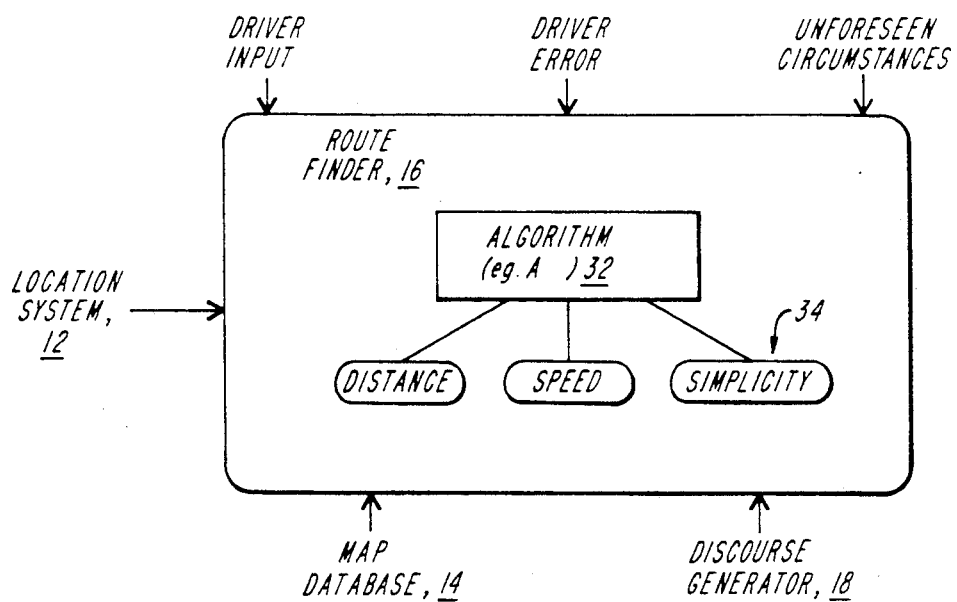
FIG. 4 is a schematic illustration of the route finder.

The route finder is shown schematically in FIG. 4. In the preferred embodiment, the route finder 16 includes, as its basis, an algorithm 32. Algorithm 32 may be, for example, an original algorithm based on a best-first search algorithm the A* algorithm, or a modified A* algorithm. In preferred embodiments, the route finder is adapted to find the best route according to any one of three cost metrics 34: distance, speed, simplicity. The route finder calculates a new route in the event of driver error or unforeseen circumstances, as indicated.

LOCATION SYSTEM AND POSITION SENSOR

The Back Seat Driver must know the position of the vehicle. This can be achieved using available technology adapted for the requirements of the Back Seat Driver. At a minimum, the location system for a vehicle navigation system must determine the vehicle position to the nearest block. If it is to tell the driver when to turn, it must be able to distinguish between the closest of two adjacent turns.

Consideration of the Boston street map shows that it has many streets which are both short and a possible choice point. Based on a study of the percentage of segments which are shorter than a given length, an accuracy of 10 meters is desirable. This is a higher accuracy than has been specified in prior art approaches (see Davis, 1989, cited above). The Back Seat Driver's use of speech imposes strict requirements on position because of limitations on time. Unlike a display, speech is transient. An action described too soon may be forgotten. The Back Seat Driver is intended to speak at the latest time that still permits the driver to act. Allowing two seconds for speech, a car at 30 mph covers 27 meters. This consideration suggests a minimum accuracy of 15 meters.

Location systems can be divided into two categories:
Position finding systems determine position directly by detecting an external signal.
Position keeping (dead reckoning) systems estimate the current position from knowledge of an earlier position and the change in position since that position.

All existing position finding systems use radio signals. The broadcast stations may be located on street corners, seacoasts, or in orbit around the earth. Systems differ in their range, accuracy, and cost. A survey of those systems which might plausibly be used for automobile navigation is included in Davis, 1989, cited above.

Position keeping (dead reckoning) systems obtain position indirectly, by keeping track of the displacement from an originally known position. One can measure displacement directly, or measure velocity or acceleration and integrate over time to obtain displacement.

The forward motion of a car is measured by the odometer. On late model cars, the odometer cable has been standardized. It revolves once every 1.56 meters. This is a reliable measure of forward progress, as long as the wheels do not slip. Measuring direction, though, is more difficult. Among the possibilities are:
magnetic compass A magnetic compass has the advantages of small size and ease of use, but is unreliable because of variation between magnetic and true north and deviation due to the ferrous material of the car and magnetic flux arising from electric currents within the car.
steering wheel The steering wheel could be instrumented to measure the amount of turning.
differential odometer When a car turns, the two rear wheels travel different distances, and thus rotate at different rates. Measuring the difference in rotation provides an indication of amount of turning. This differential rate of rotation is just what is measured by anti-skid brakes, so no additional instrumentation is required to obtain this measure for an automobile suitably equiped.
gyroscope Gyroscopes measure angular acceleration. The familiar rotation gyroscope and esoteric laser ring gyroscope are not suitable for automotive use because they are too expensive. Lower cost alternatives are the rate gyro and the gas jet gyro. The rate gyro measures angular acceleration in a vibrating piezo-electric substance. The gas gyro measures turn (or yaw) rate. In this design, a jet of gas travels down the center of a sealed tube. Anemometers are placed on either side of stream. When the car turns, the stream is deflected and the velocity is measured. The velocity of the gas at the anemometer is proportional to the turn rate. Such devices can measure turn rates of up to 100 degrees per second, with a noise of about one half degree/second.

Figure 5:
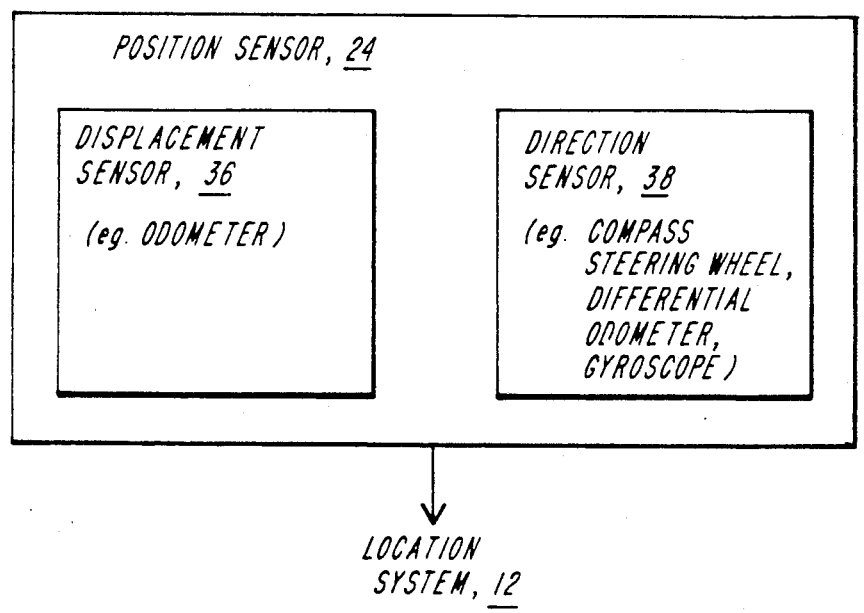
FIG. 5 is a schematic illustration of the position sensor.

The position sensor is shown schematically in FIG. 5. As indicated, it includes a displacement sensor 36 and a direction sensor 38.

A position keeping system with no error could be calibrated when installed, and then maintain its own position indefinitely. Unfortunately, errors arise in measuring both distance and heading. Sources for error include difference in tire pressure, composition and wear, slipping, cross steering from winds, change in tire contact path in turns, magnetic anomalies, and gyro noise. The NEC dead reckoning system, employed in the prototypes of the Back Seat Driver, accumulates about one meter of error for every ten meters traveled. The error is even worse when traveling near railroads because the NEC system uses a magnetic compass.

Some dead reckoning systems recalibrate themselves to eliminate systematic errors. Such recalibration is possible when the vehicle is at a known position or when stopped. One way to correct dead reckoning errors is to use knowledge of the road network as a constraint on position, in what is known as map matching. Map matching requires that the position keeping system have a map of the locale where the vehicle is being driven, and is based on the assumption that the vehicle is always on a street present in the map. If the estimated position falls to one side of the road, the estimate can be corrected. When the vehicle makes a turn, the system assumes the vehicle is at the closest intersection, and thus the absolute position can be estimated. Every dead reckoning system uses some form of map matching. Map matching reduces the stringency of position keeping, but accuracy remains a concern, since the system must maintain its position when the driver drives off the map, e.g. into a driveway or a parking lot.

In the working prototypes, a unit built by NEC Home Electronics, Ltd. is employed. It is a dead-reckoning position keeping system which uses speed and direction sensors. To compensate for error, it uses map matching on a map database stored on CD-ROM. The unit is described in "CD-ROM Assisted Navigation Systems" by O. Ono, H. Ooe, and M. Sakamoto, in *Digest of Technical Papers, IEEE International Conference on Consumer Electronics*, Rosemont, Ill., Jun. 8-10, 1988.

As implemented in the working prototypes, the map database used by the location system is completely distinct from the map database used by the route finder and discourse generator. This is unfortunate since the maps will not always agree unless they are kept equally up-to-date. However, in other embodiments within the scope of the invention, the location system uses the computing resources and map database of the main computing apparatus illustrated in FIG. 1. Positioning systems for the Back Seat Driver preferably combine position keeping and position finding, since neither alone will work all the time. A position keeping system needs periodic corrections, but a position finding system that depends on radio reception will not work in tunnels or bridges. Hybrid systems which could be used by the Back Seat Driver are referenced and discussed in Davis, 1989, cited above.

DISCOURSE GENERATOR

The Back Seat Driver attempts to provide instructions to the driver as a passenger in the car familiar with the route would. The content and timing of the instructions and other messages described below are based on a study of natural driving instruction described in detail in Davis, 1989, cited above.

To the Back Seat Driver, a route is a sequence of street segments leading from the origin to the destination. Each connection from one segment to another is considered an intersection, even if there is only one next segment at the intersection. At any moment, the car will be on one of the segments of the route, approaching an intersection. The task of the Back Seat Driver is to say whatever is necessary to get the driver to go from the current segment, across the intersection, to the next segment of the route. Most often, nothing need be said. But at other times, the Back Seat Driver will need to give an instruction.

Instructions must use terms familiar to the driver. An example is what to say at a fork in the road. Considering only topology, there is no difference between a fork and a turn, but it would be confusing to call a fork a turn.

The two key issues in describing a route are deciding what to say and deciding when to say it. There is a tradeoff between these two factors. At one extreme are directions given completely in advance, with no control over when the driver reads them. A direction of this kind might be: "Go half a mile, then take a left onto Mulberry Street". A driver following such an instruction must use the odometer to estimate distance or look for a street sign. The instruction itself does not say when to act. The other extreme are instructions which rely totally on timing for success. Such an instruction might be: "Turn left now".

An intersection type is called an act because the important thing about an intersection is what action the driver takes to get across it. The Back Seat Driver is preferably implemented with an object-oriented programming methodology, so for each act there is an expert (an object) capable of recognizing and describing the act. The Back Seat Driver generates speech by consulting these experts. At any moment, there will be exactly one expert in charge of telling the driver what to do. To select this expert, the Back Seat Driver asks each expert in turn to decide whether it applies to the intersection. The experts are consulted in a fixed order, the most specific ones first. The first expert to claim responsibility is selected. This expert then has the responsibility of deciding what (if anything) to say.

Each act has a recognition predicate which is used to determine if a given intersection should be classified as that act. A predicate can consider topology, geometry, the types of street involved, or any other factor. The predicate also decides whether the move is obvious, that is, the driver can be trusted to do it without being explicitly told to do so. Actions that are obvious are not described. If the next action is obvious, the Back Seat Driver looks ahead along the route until it finds one which is not obvious. There will always be at least one, because stopping at the end is never obvious.

The acts in the working prototypes include CONTINUE, FORCED-TURN, U-TURN, ENTER, EXIT, ONTO-ROTARY, EXIT-ROTARY, STAY-ON-ROTARY, FORK, TURN and STOP.

A CONTINUE is recognized when the driver is to stay on the "same" road. Almost always, a continue is obvious and nothing should be said. The continuation of a street depends on the type of street: from a rotary, it is the next rotary segment; from an access ramp, if there is exactly one next segment, that is the continuation, otherwise there is no obvious next segment; otherwise, it is the one segment that requires no more than 30 degrees of angle change (if there is exactly one, and if it is not a rotary) or the one segment with the same name (if there is exactly one). The reason for comparing names is not because the driver is aware of the name, but because the designer who named the street was. The assumption is that if two segments have the same name, they are the same street, and that is why they have the same name. This "sameness" is presumably reflected in details not captured by the map, for example continuity of painted centerline. There are many places in the area where the obvious "straight" continuation of a segment is at an angle as great as 45 degrees, but it would not be right to call this a turn.

A FORCED-TURN is an intersection where there is only one next street segment where the road bends more than 10 degrees. Even though there is no decision to make at a forced turn, it is useful to mention because it strengthens the driver's sense that the Back Seat Driver really knows about the road conditions. A forced turn is not worth mentioning if both segments are part of a bridge, a tunnel, or an access ramp, or if the angle is less than 20 degrees.

The U-TURN action is recognized when the heading of the car is the opposite of what it should be. Recall that a route is a sequence of segments and endpoints. At all times the car will be on one of the segments in the sequence. If the car's orientation is not the same as the endpoint in the path, then the driver must turn around. Preferably, the route finder only calls for a U Turn if there is no other way.

To ENTER is to move onto a super street (or an access ramp that leads eventually to a super street) from an ordinary street, but not from a super street or an earlier access ramp. Similarly, to EXIT is to move from a super street onto a street with lesser quality that is either an access ramp or has a different name. Some super streets are not uniformly super and it would not be right to call the change in quality an exit.

To go ONTO-ROTARY, to STAY-ON-ROTARY, and to EXIT-ROTARY are acts which can be correctly described only if the street map database includes an explicit marking of streets as rotaries.

At a FORK, there must be at least two alternatives, all within a narrow angle, and none of the branches must be the obvious next segment—that is, the branches must all be more or less equal. Either all the alternatives must be access ramps, or none of them must be. A branch can only be considered obvious if it is the only branch with the same level of quality, or if it is markedly straighter than the others, or if it is the only one with the same number of lanes, provided that all of these clues agree. If one branch is stronger than the others, the intersection is not a fork. It is either a continue or a turn.

The STOP action is recognized when the vehicle is on the destination segment. Finally, a TURN is an intersection not handled by one of the above cases. The greatest weakness of the above approach is that the recognition predicates are sensitive to small changes in the angles between segments. It is not likely that people use absolute numbers (e.g. 10 degrees) as cut-off values for their determination of how to describe an intersection. More likely, different classifications compete. Still more important, people making classifications use visual cues, not just facts from the map.

Each act has a description function to generate a description of the action. The description function takes inputs specifying the size of the description (brief or long), the tense (past, present or future), and the reference position. A short description is the minimum necessary for the act. It is typically an imperative (e.g. "Bear left."). A long description includes other facts about the action, an expression indicating the distance or time until the act is to be performed, and possibly information about the next act, if it is close. The reference position is a position (along the route) from which the action is to be described.

A brief description consists only of a verb phrase. The verb depends on the type of act and perhaps on the specifics of the act. Besides the verb itself, the verb phrase must say which way to go. In most cases, the word "left" or "right" is sufficient. Where it is not, the possibilities are to use a landmark or to describe the turn. A landmark can be either in the appropriate direction ("towards the underpass") or the other direction ("away from the river"). Specifying direction with a landmark has the advantage that some drivers confuse left and right sides, or mishear the words, so it is a redundant cue. Also, it increases the driver's confidence that the system really knows what the land looks like. A description of the turn can mention either quality or the relative angle of the desired road. The angle must be described qualitatively (more or less "sharp"). It would be more precise to use the angular distance (e.g. "turn right 83 degrees"), but drivers would not understand it. Preferably, the expert for each act follows a protocol which includes:

recognize?—is a proposed movement an example of this kind of driving act?
instruction-vp—generate a verb phrase describing this act
instruction-np—generate a noun phrase describing the act
position-to-doit—the position where the driver would begin carrying out the act
obvious?—would the driver do this act without being told?
sentences—generate all sentences needed to describe this act
congratulate?—should the driver be congratulated after carrying out this kind of act The following sample is a Back Seat Driver description of the left turn from Fulkerson Street to Main Street in Kendall Square, Cambridge, Mass.:

Get in the left lane because you're going to take a left at the next set of lights. It's a complicated intersection because there are two streets on the left. You want the sharper of the two. It's also the better of them. After the turn, get into the right lane.

This instruction begins with a piece of lane advice, an action to be taken immediately, then describes an action in the near future. The action is a turn, though that word is not used explicitly. It tells the direction of the turn (left) and specifies a landmark (the lights) that says where the turn is. In many cases, this would be enough, but here there are two streets on the left, so the instruction goes on to specify the desired road in two ways (by comparative position and relative quality). Finally, it concludes with some lane advice to be executed during (or just after) the act.

The above example is the most complicated text that the Back Seat Driver prototypes have produced. Length and detail are not virtues in giving directions. The Back Seat Driver produces a text this long only because it does not have better means to make the driver follow the route. If a shorter text would accomplish the same aim, it would be better.

Besides telling drivers what to do, the Back Seat Driver must also tell them when to do it. One way to do this is by speaking at the moment to act, but it is useful to also give instructions before the act, if time permits. This allows time for preparation, if required, permits the driver to hear the instruction twice, and also spares the driver the need to be constantly alert for a command which must be obeyed at once.

When an act is more than a few seconds in the future, The Back Seat Driver uses a long description, which includes one or more cues which either describe the place for the act, the features of the road between the current location and the place, or the distance or time until the act. This description should be so clear that the driver cannot only recognize the place when it comes, but can also be confident in advance that she will be able to recognize the place.

The Back Seat Driver preferably uses a landmark as a cue when it can. A numeric distance is the cue of last resort. However, some drivers prefer to also hear distances, especially if the distance exceeds a certain threshold. Therefore, a parameter is preferably included in the user-model, described below, for this minimum distance expressed as a number. If the distance is below this, a qualitative phrase is produced by the discourse generator, if above, a number is produced. The cutoff can be zero, in which case numbers are always used, or set to an infinite value, in which case they never are.

A cue is expressed either as a full sentence ("Drive to the end of the street, then . . . ") or a preposed preposition phrase ("At the next set of lights, . . . "). Research has shown that a cue should not be expressed by a preposition after the verb as in "Take a left at the lights," because some drivers start to take the left as soon as they hear the word "left". This may be because synthetic speech does not provide enough intonational cues for the driver to reliably predict the length of the sentence, leading the driver to act on syntactic information alone, and thus taking the sentence to be complete as soon as the word "left" is heard.

The description of a road feature depends upon whether or not it is visible. If it is, it can be referred to with a definite article ("the rotary", "the overpass"). If not, an indefinite article is used. The program cannot tell whether an entity is actually visible, so it uses distance as an approximation. If the feature is closer than one tenth of a mile, it is considered to be visible.

A special case of cues is when the driver is at the place to act. When stopped a few meters from the intersection, it is wrong to say "Turn at the next lights" even if it is literally true. In the working prototypes, the Back Seat Driver thinks of itself as being at that intersection it if its less than thirty yards away, except that if there is a stop light at the intersection and the car is not moving, then the intersection distance if fifty yards, since cars might be backed up at such an intersection. When at an intersection, the Back Seat Driver should say "Take a left here" rather than "Take a left now" because drivers waiting for a traffic light will rightly resent being told to do something they have good reason not to do.

Traffic lights are very good landmarks because they are designed to be easily seen and drivers have an independent reason to watch for them, namely a desire to avoid accidents. When referring to a traffic light, if the car is at the intersection for the lights, the Back Seat Driver should use a proximal deictic ("this" or "these", as opposed to the distal "that" or "those") to show it means the lights that are here.

The Back Seat Driver preferably has a database of buildings as part of its directory of services. If it finds a building on the corner, it should include it as a potential landmark; e.g. "Look for Merit Gas on the left side".

Other landmarks are features of the road, such as underpasses, bridges, tunnels, bends in the road, and railroad crossings. Still another potential landmark is the road coming to an end. This is a landmark that is impossible to miss. However, research has shown that if the Back Seat Driver says "Drive all the way to the end, then ...," some drivers take "the end" to mean not "the farthest you can go along this road" but just "the next intersection".

A street name can be a landmark, but not a good one, unless the driver already knows the street. There are several reasons why street names should not be used. First, the driver may not hear the name correctly. Second, the driver may hear the name, but not know how to spell the name after hearing it, so she may not recognize the name in its printed form. This is especially a problem when the driver is from out of town. Finally, even if the driver knows the spelling, street signs are often missing, turned around, or invisible due to weather or darkness. Despite all the problems that come with using street names, many drivers ask for them. To accommodate them, a parameter in the user-model is preferably included to control the use of names. If set, names are supplied as part of the instruction. When names are included, they are preferably attached at the end of the instruction ("Take the second left. It's Elm Street.") rather than directly ("Take the second left onto Elm Street."), which weakens their salience somewhat, and makes them more of a confirmatory cue than an essential one.

Signs can be important landmarks. A problem with using signs as cues occurs, however, if the information in the sign is stored as unstructured text in the map database. It is important that the Back Seat Driver understand what the sign says, not simply utter the words. There are two reasons for this. First, the Back Seat Driver's internal representation for text is preferably based on syntactic structure, not text strings. Second, the objects mentioned in the signs (cities and roads) should be entered into the discourse model to become salient for future reference. The Back Seat Driver should parse sign text by separating it into tokens delimited by commas and the word "and", and then attempt to recognize objects on the map (street names, cities, neighborhoods) from these tokens. When recognition fails, the token cannot be entered into the discourse model. When parsing fails, the spoken output will have incorrect grammar.

The Back Seat Driver does not assume that the driver will recognize the place to act (e.g. by seeing a street sign) so the driver must be told when (or where) to act. The Back Seat Driver uses timing ("Take a left here") when the driver has reached the place to act. The working prototypes calculate the place to speak by finding a distance from the intersection which is v * ($t_{speak} + t_{reaction}$), where $t_{speak}$ is the time to speak the utterance and $t_{reaction}$ is the driver's reaction time. The time to speak depends on the number of words in the utterance. (The Dectalk synthesizer used in the prototypes speaks 180 words per minute.) Reaction time can be estimated to be two seconds.

The Back Seat driver speaks autonomously, but preferably provides means to allow it to speak on demand. The driver at any time should be able to ask for instructions immediately by, for example, pushing buttons representing "What next?" and "What now?". In addition, while following a route, a driver should be able to ask to hear the total length of the route and the remaining distance. A driver should also be able to ask to hear the name of the street the car is on and the compass direction the car is headed.

In order to generate more fluent text, the Back Seat Driver preferably keeps track of what has been mentioned. Some instructions are obvious after having been given. If the system tells the driver to go straight through a set of lights, there is no reason to repeat the instruction when actually at the lights. This is in contrast with a turn, where the driver hears advance instructions to know what to do, and immediate instructions to know when to do it. This can be important, for if the driver hears "go straight through the lights" twice, she may try to go through two sets of lights. To implement this, each instruction should be able to determine whether it is obvious after having been given once. When it is time to speak the instruction, if the instruction has already been given, and it is obvious once spoken, then it should not be spoken again.

The Back Seat Driver preferably retains a history of the route. This allows it to generate cue phrases for the instructions. If the route calls for doing the same thing twice in a row, the system uses the work "another" to indicate this doubling. This is important for polite behavior. If a passenger were to give a driver instructions by just saying "Take a right. Take a right. Take a left. Take a right.", pronouncing each the same, the passenger would be judged to be rude. The passenger's speech is not acknowledging the driver's actions or history. There are two ways for the passenger to acknowledge the driver's work: using cue words ("Take a right. Take another right. Now take a left."), or using intonation. However, some speech synthesizers, such as the Dectalk used in the prototypes, does not support flexible control of intonation, so cue words are the only possibilty.

The Back Seat Driver preferably is able to warn the driver about dangers which can be inferred from knowledge of the road network. These dangers include driving above the speed limit, driving the wrong way on a one-way street, driving too fast for an upcoming curve, driving on a one-way street that becomes two-way ahead, merging traffic, "blind" driveways ahead, speed traps, poorly repaired roads, potholes, and dangerous intersections. The Back Seat Driver preferably attempts to determine hazards by reasoning about road conditions rather than requiring them to be built in to the map database.

Lane advice includes telling the driver which lane to get into (or stay out of) when applicable. The system gives lane advice as part of the instruction when approaching an intersection where it matters. The instruction may also include advice about what lane to be in after the intersection, in preparation for the next act.

Speed advice includes warning the driver to slow down if she is travelling too fast to safely negotiate a turn. The limiting factor for angular acceleration is the driver, not the cornering ability of the car. Research has shown that the average driver will accept no more an 0.1 G radial acceleration. Radial acceleration is $v^2/r$ where r is the turning radius of the turn. The Back Seat Driver knows the geometry of the road, so it can predict the maximum tolerable velocity for the turn. It need not tell the driver about this speed (the driver will choose a comfortable speed without being told), but it should estimate the distance required to decelerate, and tell the driver to slow down early enough to do this gently.

If the driver leaves the route, the Back Seat Driver immediately informs the driver and begins to plan a new route. Telling the driver what she did wrong prepares her for hearing new instructions, and perhaps helps her learn to better interpret the style of language that the Back Seat Driver uses.

To describe an error, the Back Seat Driver needs to look back to the last action that the driver failed to perform. It should utter a description of this action, saying e.g. "Oops, I meant for you to take a right," which does not blame the driver as in e.g. "You made a mistake. You should have taken a right." A driver might leave the route deliberately, or the error could be system's, not the drivers.

Errors will occur due to inaccuracies in the location system. The Back Seat Driver is preferably able to model the uncertainty of a position. For instance, when two roads diverge at a narrow angle, it will be unable to distinguish which was taken until some distance passes. It should probably assume that the driver made the correct choice rather than taking the risk of making a false accusation. If it reaches a place where the difference is crucial, yet unknown, it is probably better for it to confess its uncertainty, and say something like "I'm not quite sure where we are, but if you can take a right here, do it, and if not, keep going, and I'll figure things out better in a minute." Or it might ask the driver to pull over and stop (if the driver is at a place where that is safe) to allow for a better position estimate by averaging a few successive estimates.

Errors will also occur if the database is somewhat out of date. The Back Seat Driver can regain at least a little confidence by how it explains the mistake. Suppose that the Back Seat Driver intends the driver to turn onto "Apple" Street, and says "Take a right at the next light". Unbeknownst to it, a new traffic light has been installed at "Pear" Street, so the driver turns there. It is somewhat confusing if the Back Seat Driver says "I meant for you to go straight," because the driver may think that the program has not been consistent. A better message would be "I did not mean for you to turn onto Pear. I thought that the next set of lights was at Apple Street."

While the driver is following a route, the Back Seat Driver preferably adopts a persistent goal of keeping the user reassured about her progress and the system's reliability. If the Back Seat Driver were a human, this might be unnecessary, since the driver could see for herself whether the navigator was awake and attending to the road and driver. But the driver cannot see the Back Seat Driver and so needs some periodic evidence that the system is still there. One piece of evidence is the safety warnings the system gives. But if all is going well, there will not be any. Other kinds of evidence that things are going well should be provided. When the user completes an action, the Back Seat Driver can acknowledge the driver's correct action, saying something like "nice work" or "good". Also, insignificant remarks about the roads nearby, the weather and so on, can be provided. The driver then assumes that everything is going well, for otherwise the Back Seat Driver would not speak of trivial matters.

The Back Seat Driver should know about the knowledge and desires of its driver, and act differently because of this knowledge. This knowledge is preferably incorporated in a user-model.

For driver properties which do not change or change very slowly, such as colorblindness, or visual or aural acuity, it is acceptable for the Back Seat Driver to ask the user for such knowledge. However, for other driver properties, the Back Seat Driver preferably acquires a model of the user automatically, without asking or having to be told. For example, the Back Seat Driver could learn the driver's reaction time by measuring the time between its speech and the driver's operation of the controls.

The Back Seat Driver preferably learns the style of instruction giving appropriate for the driver. To learn the driver's preferences for route description requires either observation of the driver herself giving instructions or getting feedback from the driver about the instructions the system provides.

The driver can provide feedback about the suitability of the Back Seat Driver's instructions either explicitly or implicitly. One explicit indication of comprehension is how often the driver hits the "what now?" button. The system might collect long term statistics on the types of intersections where the user most often requests help, and begin to offer instructions without being asked. Just as the user can ask for more talking with the "what now" button, the Back Seat Driver should provide a "shut up" button (or other means to the same effect). The Back Seat Driver could also learn the effectiveness of its directions simply by watching the driver's performance—in particular, her errors. In this way, it can learn which cues are most effective.

Another opportunity for learning the driver's style is during the acquisition of speech recognition templates (for user-dependent speech recognition for driver input means, described below). The new user should play the role of a "back seat driver" and give instructions, while in a car, for some route. The instructions must be given while driving either a real car or a close simulation because the form of static driving instructions is much different from real time instructions. Given some a priori knowledge about the ways that a route can be described, it is not impossible that the system could understand the instructions, and infer style from it. A difficulty here is that if the driver knows the route well, many things will seem obvious to her that would not be obvious to another person.

If the Back Seat Driver knows what the driver knows about the city, it can give better directions. A user who knows about a city no longer need instructions, she needs information about structure. The object description system preferably provides novice users a process description which emphasizes casual connections, and experts structural descriptions. Experts do not need the casual information, they can derive it for themselves.

The attributes of the user-model preferably include:

route-preference—does the driver want the fastest, shortest, or simplest route?

reassurance-period—how often should the program speak to the driver?

use-names—should the program tell the driver the names of passing streets?

congratulate-after-act—should the program make an explicity acknowledgment of correctness to the driver after each act?

obvious-to-cross-major—can the program assume that the driver will continue straight across a major intersection without being told explicitly to do so?

scoflaw—does the driver want to be warned when she is speeding?

daredevil—does the driver want warnings when driving dangerously fast?

distance-lowpass—does the driver want to be told the distance to the next action (in yards or miles, as appropriate). Most drivers do not understand distances in tenths of miles, so by default the program mentions only those distances that exceed one half mile.

The functions of the user-model preferably include:

obvious-next-segment—given a current position, is there a unique segment such that it is almost certain the driver will go there, without being told to do so?

at-major-intersection—is the current intersection one that the driver would call "major"?

extrapolate-path—try to predict the path the driver will follow in the next N seconds, assuming she does only what is obvious.

maximum-safe-speed—calculate the maximum speed at which the driver can get through an intersection. This calculation is based on finding the segment with the greatest radius of turn, and then calculating the largest speed the vehicle could have while making that turn without undergoing unacceptable sideways acceleration.

For the Back Seat Driver to decide what to say and when to say it, it preferably has a model of the vehicle performance. It must know, for example, how slowly the car should be going in order to safely make a turn. A suitably instrumented car could also measure the coefficient of friction by comparing the applied braking force and the resulting deceleration. This would allow it to adjust the time factors used in deciding when to speak.

The Back Seat Driver should understand the driver's plans and goals. When a driver enters a destination address, she is telling the system that she has the goal of getting to that address. The Back Seat Driver might guess at higher level plans from knowledge about the destination, and take actions to assist the driver with those plans. To do this, it must know what kind of thing is at the destination address. For instance, if the address provided is that of a store, the Back Seat Driver can guess that the driver is going there to purchase something, or at least to do business there. It could check the hours that the store is open.

The Back Seat Driver should help drivers to understand the route it gives. This would make the system more pleasant to use. It would also make it easier to follow routes because a driver who understands the route and the city will use that knowledge to help interpret the commands Back Seat Driver gives. A route should fit into a larger model of the city. This means that the Back Seat Driver itself must have a model of the city and should speak of the route in terms that relate it to the city. There are several opportunities to do this. At the beginning of the route, the driver might hear an overview of the route, naming the major paths followed and neighborhoods crossed. During the route, locations could be described not just as street address but in larger units of neighborhoods and districts. Orienting information can be included in instructions, or it might come between instructions, as a passing comment.

There are some additional services that the Back Seat Driver could easily provide. It should be able to give the location of a place without giving directions, it should be able to give the directions all at once, and it should be able to give directions between any two places. A driver might want to use these to tell someone else how to get to where they are.

The Back Seat Driver should be able to communicate with the outside world if the outside world is equipped to talk to it. For instance, after determining that a given parking garage is the closest or most convenient to the current destination, the Back Seat Driver could automatically phone or radio the garage and reserve a space.

The Back Seat Driver should be running on a computer embedded in the car, so that it can get more and better information about the state of the car and driver. For instance, when the next instruction is a turn, the Back Seat Driver should notice whether and when the driver turns on the turn signals. If the driver applies them too soon, it is possible (but not certain) that the driver has underestimated the distance to the turn; if applied at the "right time" then the system can take that the action has been understood; if never applied, then the driver has either misunderstood, or is driving hazardously.

The Back Seat Driver should also be integrated into the car's audio system, rather than having separate systems for voice and music. Furthermore, it should pay attention to what the driver is listening to. If the driver is listening to the radio, or playing a CD (or using a cellular telephone) the program should try to speak less often, on the grounds that the driver has implicitly indicated a preference for what to listen to. The program should suppress reminders and historical notes altogether. When it must speak, it should borrow the audio channel rather than trying to speak over it. The Back Seat Driver should also be aware of the driver's use of other controls in the car. It should defer speech while the driver is adjusting the heat or the mirrors. for example. and suppress speaking altogether if the car makes sudden extreme changes in velocity. A driver trying to cope with an emergency situation does not need another distraction.

The discourse model preferred for the Back Seat Driver is a partial implementation of the discourse theory described by B. J. Grosz and C. L. Sidner ("Attention, intentions. and the structure of discourse" in *Computational Linguistics*, 12(3):175-204, 1986) and the theory of intonational meaning described by J. Hirschberg and J. Pierrehumbert ("The intonational structuring of discourse" in *Proceedings of the Association for Computational Linguistics*, 136-144, July 1986). Both of these articles are herein incorporated by reference. This model allows the program (or programmer) to create and manipulate discourse segments. The program specifies the contents of the discourse segment (both the syntactic form and the list of objects referenced) and the implementation of the model does the following: generates prosodic features to convey discourse structure; inserts discourse segment into intentional structure; and maintains attentional structure—adding new objects when mentioned and removing old objects when replaced. In addition it includes some useful low-level tools for natural language generation: search of attentional structure for occurence of co-referential objects; conjugation of verbs; generation of contracted forms; and. combination of sentences as "justification" sentences (e.g. "get in the right lane because you are going to take a right.") and sequential sentences ("Go three blocks. then turn left"). In order to use the discourse package the programmer must explicitly declare all semantic types used by the program, so in this case there are declarations for all objects which pertain to driving. such as street names. bridges. rotaries. stop lights and so on.

SPEECH GENERATOR

In the working prototypes of the Back Seat Driver. speech generation is performed by Dectalk. a commercial text-to-speech speech synthesizer. which is cabled to the main computing apparatus.

An alternative to synthesized speech is digitized speech. which is easier to understand than synthetic speech. Digitized speech. however. requires a great deal of storage space. There are more than 2000 different street names in Boston. Allowing another 500 words for the actual instructions, and assuming an average duration of 0.5 seconds for each word, coding this vocabulary at 64 kilobits per second would require 10 megabytes of speech storage. Given a Back Seat Driver that uses a CD-ROM for the map, the digitized speech could be stored on the disk as well. Coded speech would be more intelligible than synthesized speech, and less costly, but not as flexible. For, example, it would be impossible to read electronic mail using only stored vocabulary speech.

The generated speech is spoken to the driver through some kind of speaker system in the car. In a simple embodiment. the speaker system of the car radio is used.

DRIVER INPUT MEANS

Means for the driver to communicate with the backseat driver are required. For example. the driver must be able to enter destination addresses, request instructions or a repeat of instruction, and inform the Back Seat driver when an instruction cannot be carried out for some reason. In embodiments where the computing apparatus is installed in the automobile. a computer keyboard can be adapted to provide this communication means.

In one working prototype of the Back Seat Driver. the computing apparatus is not installed in the automobile. but is accessed through a cellular telephone. In this embodiment, the driver communicates with the Back Seat Driver by using the cellular telephone keypad. Address entry is achieved by first entering the digits, then a number sign, then spelling the street name using the letters on the telephone keypad. The letters "Q" and "Z" are on the "6" and "9" keys, respectively, and the space character is on "1", which is otherwise unused. These keys are sufficient to spell any street name in Boston. The spelling rules can be easily expanded to enter street names with other characters in them, for example, "4th Street".

In the implementation, spelling a street name requires only one button push for each letter, even though there are three letters on each key. This is because of the redundancy in street names, which are pronounceable words, not arbitrary strings. There are 37 pairs of street names in Boston with the same "spelling" in the reduced "alphabet". An example is "Flint" and "Eliot", both encoded as "35468". This is only one percent of the 2628 names of streets in Boston, so collisions are rare. This technique appears workable even for larger sets of names. When the entire word list of the Brown corpus is encoded, there are still only 1095 collisions in the 19,837 words (5.5%).

If a name collision occurs, the Back Seat Driver reads the list of possibilities, and asks the driver which one was meant. This is very rare. A more common problem is that street names are duplicated. When this happens, the Back Seat Driver asks the user a series of questions to reduce the list to a single choice. It tries to ask the fewest questions possible. It asks the user to choose from a list of street types, if that is sufficent to resolve the question, and otherwise from a list of the containing cities (or neighborhoods. if there are two instances within a single city). To select from a list, the Back Seat Driver reads the contents, asking the user to push a button when the desired choice is read.

The Back Seat Driver would be much easier to use if the driver could simply talk to it instead of using a keyboard or keypad. Speech recognition could be used for driver input means, however, address entry is a difficult task for speech recognition for the same reason it is hard for a human to understand machine speech—there are few constraints on a name. No speech recognizer available today can handle a 3000 word vocabulary with acceptable error rates. The car would also have to be stopped while the driver was speaking, because noise in moving cars for frequencies below 400 Hz can exceed 80 dB.

Back Seat Driver could also use speech recognition to replace the "What now?" and "What next?" buttons. This is a more tolerant application for speech recognition because there are fewer words to recognize.

SYSTEM PROCESSES

Figure 2:
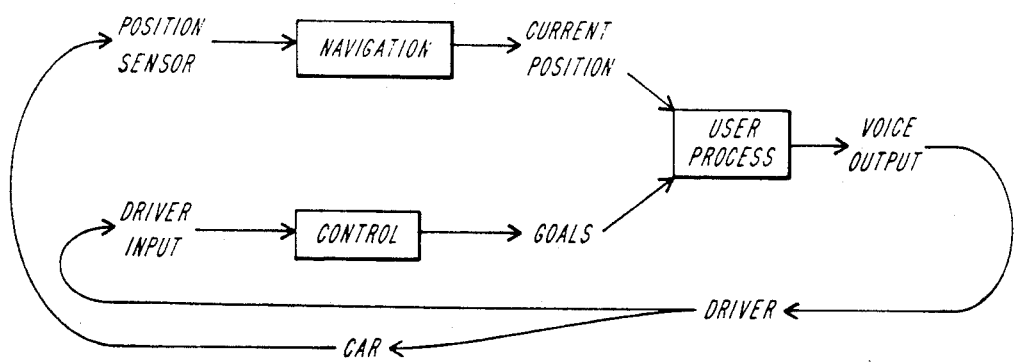
FIG. 2 illustrates the system processes of the preferred embodiment of the Back Seat Driver.

The Back Seat Driver carries out three separate tasks, each of which is executed by its own process. All processes share the same address space. so all variables and functions are accessible in every process, and no special mechanism for interprocedure call is required. Where necessary for synchronization, Back Seat Driver uses queues or locks. All three processes are simple, infinite loops. The system processes are illustrated in FIG. 2.

The user process is the main process of the Back Seat Driver. It is this process which finds routes and gives instructions to the driver. The user process manages a list of goals. Each time around the loop, it selects a goal to work on, and does something to achieve the goal, if possible. The user process is connected to the speech generator, since that is how it talks to the driver.

The navigator process maintains an estimate of the current position and velocity of the car. It is connected to the position sensor by a serial line. Preferably, packets arrive from the position sensor several times a second. The navigator converts the data in the packets from the position sensor format to the format used by the Back Seat Driver.

There are two minor processes which assist the navigator process: The average speed process computes the running average speed of the vehicle over the last five seconds. It could be made part of the navigator process, but is distinct because it is more convenient that way. The position sensor monitor process keeps track of how often packets arrive. If packets do not arrive when scheduled, it should set a flag to indicate this to inform the driver if the position sensor ceases to work properly.

The control process is responsible for controlling the Back Seat Driver as a whole. The control process is connected to driver input means for entering, for example, the destination and requesting additional instructions while driving (e.g. the "What now"?, "What next?" and "I can't do it" features.) Other functions of the control process are useful in a research prototype, but should not be required in a commercial embodiment of the Back Seat Driver. One such function is debugging.

The user process is a goal-driven perpetual loop which seeks to use the resources available to it to satisfy as many goals as possible as quickly as possible, devoting resources first to those goals which are of greatest importance. There are two aspects to this process, goal structures (which names goals) and goal-functions (which tell how to accomplish them). A goal is just a name, a priority (a number), and a set of slots (parameters). Thus for instance a typical goal would be (GET-TO-PLACE<140 Elm Street>), where the goal has one slot, namely the destination. A goal-function is a function which is possibly able to achieve a goal. When a new type of goal is defined, the programmer also tells the system which goal functions can possibly meet it, and later, when the system tries to accomplish a goal it selects from this list.

The goal loop is a three step process. 1) Check to see whether there are any newly added goals. The driver can add a goal by hitting a key, and the system can also add goals. 2) Find the most important goal to work on. 3) Work on that goal. In general, systems should use resources in the most efficient manner possible. For the Back Seat Driver, the only resource is speaking time. The only way the Back Seat Driver can accomplish any of its goals is by speaking. Speech is a resource because the program can only say one thing at a time, and speaking takes a finite time. It is also important to note that spoken utterance has a useful effect only if completely spoken, so it is not helpful to begin to speak if there is not time to complete the speech.

The protocol for a goal function preferably includes the following:

progressable?—Is the goal able to accomplish anything at this time?
resource-used—If it runs now, what resources will it want to use?
maximum-time-of-resource—If it runs now, how long (in seconds) will it need each resource?
minimum-time-to-resource—The minimum time that it can estimate until it may again need this resource, and the priority of its use at that time.

In the working prototypes of the Back Seat Driver, the list of all goals is stored in the global variable *goals*. The goal loop and goal structures are defined in the file goals.lisp. The various goals and goal functions of the Back Seat Driver are defined in the files main.lisp, route-goals.lisp, and get-to-place.lisp. All goals which use speech are built from the speech-goal object defined in speech-goal.lisp. The speech resource itself is defined in speech-resource.lisp.

The goal or function which gets a user to a destination is called GET-TO-PLACE. An explanation of this goal will illustrate the goal mechanism in more detail, as well as illustrate how this most important function of Back Seat Driver is implemented. The goal GET-TO-PLACE, has two slots, destination which is the location the user wants to get to, and route which is the route the Back Seat Driver intends to use to get there.

The driver adds the goal to the system goal list by striking a key. When the goal is first created, the destination is not known (the destination slot is empty), so the goal function for GET-TO-PLACE creates a subgoal, GET-DESTINATION, and adds it to the goal list. Now there are two goals on the goal list, GET-TO-PLACE and GET-DESTINATION, but only the second is progressable, because when a goal has a sub-goal, it is not allowed to run until the sub-goal finishes. Therefore, the only progressable goal is GET-DESTINATION, which attempts to get a destination by asking the user to enter an address. If the user fails to do so, the subgoal fails, which in turn causes GET-TO-PLACE to fail, and the Back Seat Driver says "Travel cancelled". Otherwise, it writes the destination into the destination slot of the GET-TO-PLACE goal. Now that the sub-goal is complete, GET-TO-PLACE can once again make progress. This time it finds that the route slot is empty, and again calls for the sub-goal GET-ROUTE, which calculates a route. When this is complete a third subgoal is invoked, namely FOLLOW-ROUTE.

The goal function for FOLLOW-ROUTE gets the driver to the destination by speaking instructions. If something goes wrong (for example if the driver makes a mistake) then the subgoal fails. But this does not make GET-TO-PLACE give up. Instead, it erases the route slot, and simply finds a new route, and then tries FOLLOW-ROUTE again. This continues, no matter how many times things go astray, until either FOLLOW-ROUTE succeeds, or the driver cancels the trip.

The goal FIND-SERVICE is similar to GET-TO-PLACE except the driver selects a kind of service (for example, a gas station), and then the Back Seat Driver finds the closest provider of that service, and then finds a route to it. Following that route is done by FOLLOW-ROUTE in the same way as for GET-TO-PLACE.

The FOLLOW-ROUTE goal function gets the user to her destination by giving spoken instructions. There are several reasons it might speak:
at the beginning, to alert the driver to give an instruction in advance, so the driver will be ready to give an instruction when it is time to do it to confirm that the driver has correctly carried out an instruction to inform the driver of her arrival at the destination to reassure the driver that she is still on route to inform the driver of a mistake to warn the driver that she is driving so fast that the program cannot keep up.

FOLLOW-ROUTE decides the next reason for speaking by first trying to locate the current position on the path. If the position is not on the path (more precisely, if the current segment does not occur anywhere on the path) then the driver has left the path (or the position sensor has made an error). Otherwise, FOLLOW-ROUTE determines what instruction must be next executed by calling the function next-driver-instruction.

The goal function protocol requires that FOLLOW-ROUTE support the goal function minimum-time-to-resource, which estimates the minimum time until FOLLOW-ROUTE will next speak. This time depends upon the reason for the next speaking. FOLLOW-ROUTE speaks immediately when beginning, confirming, warning, or finishing the route. When the driver is off the route. FOLLOW-ROUTE waits a few seconds before speaking, just in case the driver's departure from the route is actually a temporary error by the position sensor.

Given that the driver is on the path, FOLLOW-ROUTE determines when to speak by calculating the position where it must begin speaking the instruction text, then estimating the time required to reach that position at the driver's current speed. As the driver's speed changes, so will this estimated time. The position to begin speaking is calculated by first finding the position where the instruction is executed, then moving back a distance to allow the Back Seat Driver time to speak the text and the driver to react to it.

The Back Seat Driver can also give instructions in advance, if desired. It does this in much the same way, except that it adds an additional number of seconds (normally thirty) to the time estimate, and so begins to speak much sooner. When it gives instructions in advance the instruction text is longer because the program has more time to speak.

When the driver leaves the route FOLLOW-ROUTE starts a timer. If the driver has not returned to the route by the time the timer goes off (at present, two seconds) then FOLLOW-ROUTE checks for a possible mistake. In describing the mistake, it attempts to characterize what the driver actually did as well as what the program intended the driver to do. It is able to do this because in the main loop it stored the last position that the driver was on when last on the route.

Goals may interrupt lower priority goals by requesting the speech resource to interrupt the lower priority goal. Interruption stops the speech synthesizer immediately. The interrupted goal is informed of the interruption, and can react as it chooses. There is no way for the goal to know whether any of its words were actually spoken, so it has to start all over. Most goals attempt to run again as soon as possible. The assumption is that the interruption occurred because the user started some higher priority goal after learning how to do so through the help command.

The system treats "repeat the last statement" as a goal, rather than as a special purpose function, except that the importance of this goal is set to the value of the last goal spoken (the goal whose utterance is being repeated). This guarantees that if some more important goal desires to speak, it will be able to. A repetition of an utterance is no more important than it was originally.

Goals can be temporary or presistent. Temporary goals can be satisified, but persistent goals never can be. All system initiated goals are persistent. The system goals include warning the driver of dangers ahead (WARN-DRIVER) and informing the user of new electronic mail or other messages (if the computer apparatus of the Back Seat Driver is connected to the outside world). These goals can never be satisified. The driver's safety should always be preserved and mail or messages can arrive at any time.

CELLULAR PHONE EMBODIMENT

The Back Seat Driver is preferably an in-car navigation system, but in some embodiments, it may be desirable to not have the entire computing apparatus installed in the car. This is the case if the computing apparatus is too large or if a number of cars are to share a single computing apparatus.

For such embodiments, two cellular phones installed in the car can be used to transmit data from the car to the computing apparatus, and to receive voice from the speech generator in the computing apparatus. In this embodiment, data from the position sensor installed in the automobile is sent through a cellular phone in the car equipped with a modem to a phone connected to the computing apparatus via a modem. The voice generating apparatus of the computing apparatus sends speech over another phone to a second cellular phone installed in the automobile.

This embodiment has been implemented in a working prototype, using a large workstation computer (a Symbolics Lisp Machine). In this implementation, a position sensor installed in the car estimates vehicle position, heading, and velocity, and sends a data packet, once per second, through a modem to the workstation. The workstation sends characters to a Dectalk speech synthesizer, which in turn sends voice over a second phone to the driver.

Nearly everyone who has used a cellular phone knows how noisy they are. Cross talk is common and noise bursts and signal loss make it hard to hear. A sufficiently bad noise burst can even cause the cellular system to terminate the call. The problems for data transmission are even worse. By its very nature, cellular radio transmission is subject to multi-path interference, which causes periodic fades as the antenna moves in and out of anti-nodes. In addition to this fading, there is a complete loss of audio signal for as long as 0.9 seconds when the phone switches from one cell site to another (hand off).

An attempt to use an ordinary (land-line) modem from the car was unsuccessful. In the prototype, a Worldlink 1200 from Touchbase Systems was used in the car, with a Morrison and Dempsey AB1 data adapter, and an NEC P9100 phone, boosted to 3 watts. At the base station, both a Practical Peripherals 2400 and a Hayes Smartmodel 1200 were used. Even at 300 baud the connection was too noisy to use. Worse, connections seldom lasted more than five minutes. In all cases, the "loss of carrier" register (S10) was set to its maximum value, 20 seconds. Loss of carrier signal alone cannot explain why the connections dropped. The modems were capable of tolerating a complete loss of audio for up to twenty seconds.

Better results were found using an error correcting modem (The "Bridge") made by the Spectrum Cellular Corporation. This modem uses a proprietary protocol (SPCL) for error correction. The Spectrum product virtually eliminated noise, at the price of a lower data transmission rate. According to the protocol, the transmitting modem groups characters into packets that include error correction bytes. If only a few errors occur, the receiving modem repairs the data and acknowledge receipt. If there are many errors, the packet is retransmitted. If the sending modem has to retransmit too often it makes the packets smaller, on the assumption that a smaller packet has a better chance of success. This is less efficient, since packets have a fixed overhead, the percent of the channel used by data decreases. When conditions improve the modem increases packet size again. In theory, the modem can transmit at 120 characters per second, but tests made by recording the time required to receive the three characters of an odometer sequence demonstrated that the average value is closer to 30 characters per second. This sequence is transmitted once per second. The mean for durations for the three character sequences is 94 milliseconds, which is 31 milliseconds per character, or 32 characters per second.

Even with the cellular modem, calls are sometimes dropped. The call durations are usually long enough for a successful trip with the Back Seat Driver. Voice calls are dropped at about the same rate as data calls.

The protocol used by the Spectrum modem acknowledges all data transmitted. If the acknowledgment is not received, it retransmits the data until acknowledged. Under adverse conditions, this can result in an arbitrarily long delay. This is a problem when real-time data is transmitted. Observation of the Back Seat Driver shows that sometimes the system will "freeze" for from one to ten seconds. During this time, the car of course continues to move. If these freezes occur near decision points, the driver may go past the intersection without being told what to do. At 20 miles per hours a car travels nearly 45 meters in five seconds. The navigation system in the car sends a packet once every second. Most packets arrive within a second, but a few are delayed, some by up to ten seconds. (These delays may also arise from delays at the workstation. Lisp Machines are not noted for real-time response.)

It would be better to have a protocol which guarantees to deliver data intact and free of errors, if it delivers it at all, but does not guarantee to deliver the data. Real time data is only valuable in real time, and time spent retransmitting old data is taken away from ever, more valuable data. Such a protocol modification is feasible for the Spectrum product.

What is claimed is:

1. An automobile navigation system which produces spoken instructions to direct a driver of an automobile to a destination in real time comprising:

computing apparatus for running and coordinating system processes, driver input means functionally connected to said computing apparatus for entering data into said computing apparatus, said data including a desired destination.

a map database functionally connected to said computing apparatus which distinguishes between physical and legal connectivity.

position sensing apparatus installed in the automobile and functionally connected to said computing apparatus for providing said computing apparatus data for determining the automobile's current position.

a location system functionally connected to said computing apparatus for accepting data from said position sensing apparatus, for consulting said map database, and for determining the automobile's current position relative to the map database, a route-finder functionally connected to said computing apparatus, for accepting the desired destination from said driver input means and the current position from said location system, for consulting said map database, and for computing a route to the destination, a discourse generator functionally connected to said computing apparatus for accepting the current position from said location system and the route from said route finder, for consulting said map database, and for composing discourse including instructions and other messages for directing the driver to the destination from the current position, a speech generator functionally connected to said discourse generator for generating speech from said discourse provided by said discourse generator, and voice apparatus functionally connected to said speech generator for communicating said speech provided by said speech generator to said driver.

2. The automobile navigation system of claim 1 wherein said map database comprises a set of straight line segments and a set of nodes, each endpoint of each segment being a pointer to a node representing the coordinates of the endpoint and the set of other segments which are physically and legally connected to that endpoint.

3. The automobile navigation system of claim 1 wherein said map database is based on DIME files of the United States Census extended to represent physical and legal connectivity.

4. The automobile navigation system of claim 3 wherein said DIME file is further extended to distinguish bridges, underpasses, tunnels, rotaries, and access ramps from other street types.

5. The automobile navigation system of claim 1 wherein said map database is based on TIGER files of the United States Census and United States Geological Survey extended to represent physical and legal connectivity.

6. The automobile navigation system of claim 5 wherein said TIGER file is further extended to distinguish bridges, underpasses, tunnels, rotaries, and access ramps, from other street types.

7. The automobile navigation system of claim 1 wherein said map database comprises a three-dimensional representation of street topology.

8. The automobile navigation system of claim 1 wherein said map database includes measures of street quality.

9. The automobile navigation system of claim 1 wherein said map database distinguishes divided streets.

10. The automobile navigation system of claim 1 wherein said map database includes landmarks such as signs, traffic lights, stop signs and buildings.

11. The automobile navigation system of claim 1 wherein said map database includes lane information.

12. The automobile navigation system of claim 1 wherein said map database includes speed limits.

13. The automobile navigation system of claim 1 wherein said map database includes expected rate of travel.

14. The automobile navigation system of claim 1 wherein said map database includes time-dependent legal connectivity.

15. The automobile navigation system of claim 1 wherein said map database includes turn difficulty.

16. The automobile navigation system of claim 1 wherein said map database includes vehicle street, lane, and height restrictions.

17. The automobile navigation system of claim 1 wherein said map database includes traffic light cycles.

18. The automobile navigation system of claim 1 wherein said map database distinguishes where right turn on red is allowed.

19. The automobile navigation system of claim 1 wherein said map database includes a database of service locations.

20. The automobile navigation system of claim 1 wherein said map database includes a listing of famous places by name.

21. The automobile navigation system of claim 1 further comprising means for updating said map database.

22. The automobile navigation system of claim 1 further comprising means for updating said map database by radio broadcast.

23. The automobile navigation system of claim 1 wherein the map has minimum accuracy of 10 meters.

24. The automobile navigation system of claim 1 wherein said route finder is based on a best-first search algorithm.

25. The automobile navigation system of claim 1 wherein said route finder is based on an A* algorithm.

26. The automobile navigation system of claim 1 wherein said route finder is based on an A* algorithm modified to find a route in less time.

27. The automobile navigation system of claim 1 wherein said route finder is adapted to find a best route according to any one of three cost metrics: distance, speed, simplicity.

28. The automobile navigation system of claim 1 wherein said route finder is adapted to calculate a new route if the driver or vehicle navigation system makes an error or if the route is unnavigable due to unforeseen circumstances, wherein said new route does not simply backtrack to the point of the error if a better route from the current location exists.

29. The automobile navigation system of claim 1 wherein said route finder is adapted to calculate a new route while the automobile is in motion, wherein said new route will begin from the location of the automobile at the time the calculation of the new route is completed.

30. The automobile navigation system of claim 29 wherein an estimated time to find a new route is multiplied by the velocity of the automobile to calculate the position from which the new route should start.

31. The automobile navigation system of claim 30 wherein said estimated time to find a new route is calculated by multiplying the distance between the starting and ending points of the new route by a constant.

32. The automobile navigation system of claim 1 wherein said location system is a position-keeping (dead-reckoning) system.

33. The automobile navigation system of claim 1 wherein said location system is a hybrid of position-keeping and position-finding systems.

34. The automobile navigation system of claim 1 wherein said location system employs map matching.

35. The automobile navigation system of claim 1 wherein said position sensing apparatus comprises displacement and direction sensors installed in the automobile.

36. The automobile navigation system of claim 1 wherein said position sensing apparatus measures displacement with an odometer.

37. The automobile navigation system of claim 1 wherein said position sensing apparatus measures direction with a magnetic compass.

38. The automobile navigation system of claim 1 wherein said position sensing apparatus measures direction by monitoring the turning of the steering wheel.

39. The automobile navigation system of claim 1 wherein said position sensing apparatus measures direction with a differential odometer.

40. The automobile navigation system of claim 1 wherein said position sensing apparatus measures direction with a gyroscope.

41. The automobile navigation system of claim 1 wherein said discourse generator is based on an object-oriented programming methodology.

42. The automobile navigation system of claim 1 wherein each intersection in a route is classified into one type in a taxonomy of intersection types, and the disclosure generated in relation to each said intersection depends on its type.

43. The automobile navigation system of claim 42 wherein said taxonomy of intersection types includes continue, forced-turn, U-turn, enter, exit, onto-rotary, stay-on-rotary, exit-rotary, fork, turn, and stop.

44. The automobile navigation system of claim 42 wherein said discourse generated further depends on a description function for each intersection type which generates a description given the length and tense of the desired description and the position along the route from which an instruction is to be given.

45. The automobile navigation system of claim 1 wherein said discourse generated comprises a long description of an act given substantially before the act is to be performed and a short description given at the time the act is to be performed.

46. The automobile navigation system of claim 45 wherein said long descriptions includes cues.

47. The automobile navigation system of claim 46 wherein said cue is a landmark.

48. The automobile navigation system of claim 1 wherein said driver input means includes means for said driver to demand immediate instructions, or clarification or repetition of instructions already provided.

49. The automobile navigation system of claim 1 wherein said driver input means includes means for said driver to indicate to said automobile navigation system that a given instruction provided by said system is impossible to complete for some reason and that a new route must be calculated.

50. The automobile navigation system of claim 1 wherein said driver input means comprises a voice recognition system to allow at least some driver input to be spoken.

51. The automobile navigation system of claim 1 wherein said automobile navigation system records a history of the route and the discourse already generated and uses this knowledge to generate cues for future discourse and make future discourse more understandable.

52. The automobile navigation system of claim 1 wherein said automobile navigation system warns drivers of dangers inferred from knowledge of the road network.

53. The automobile navigation system of claim 1 wherein said automobile navigation system informs a driver if an error has been made as detected by the location system.

54. The automobile navigation system of claim 1 wherein said discourse generator is responsive to a user-model stored in said computing apparatus to customize discourse to the requirements and preferences of said driver.

55. The automobile navigation system of claim 1 wherein said speech generator is a speech synthesizer.

56. The automobile navigation system of claim 1 wherein said speech generator uses digitized speech.

57. The automobile navigation system of claim 1 wherein said computing apparatus is not installed in the automobile, and said automobile navigation system further comprises means for communication between said computing apparatus and the automobile navigation system components installed in the automobile.

58. The automobile navigation system of claim 57 wherein said means for communication is two cellular phones in said automobile, one of which is connected to a modem, and two phones connected to said computing apparatus, one of which is connected to a modem, whereby one data channel and one voice channel between said automobile and said computing apparatus is created.

* * * * *

UNITED STATES PATENT AND TRADEMARK OFFICE
CERTIFICATE OF CORRECTION

PATENT NO. : 5,177,685
DATED : January 5, 1993
INVENTOR(S) : James R. Davis, et al.

It is certified that error appears in the above-indentified patent and that said Letters Patent is hereby corrected as shown below:

Column 1, line 18: after "all" please insert "three";

Column 7, line 50: delete "street" and insert therefor -- streets --;

Column 11, line 11: after "algorithm" please insert ", ";

Column 11, line 66: after "compass" and before "A" please insert ": ";

Column 12, line 4: after "wheel" and before "The" please insert ": ";

Column 12, line 6: after "odometer" please insert ": ";

Column 12, line 14: after "gyroscope" and before "Gyroscope" please insert ": ";

Column 16, line 36: delete "to also" and insert therefor -- also to --;

Column 17, line 18: delete "its" and insert therefor --it is --.

Column 17, line 18: delete "that";

Column 17, line 20: delete "if" and insert therefor -- is --;

Column 17, line 18, delete "it".

UNITED STATES PATENT AND TRADEMARK OFFICE
CERTIFICATE OF CORRECTION

PATENT NO. : 5,177,685
DATED : January 5, 1993
INVENTOR(S) : James R. Davis, et al.

Page 2 of 2

It is certified that error appears in the above-indentified patent and that said Letters Patent is hereby corrected as shown below:

Column 18, line 61: delete "work" and insert therefor -- word --;

Column 21, line 16: delete "need" and insert therefor -- needs --;

Column 21, line 19: delete "casual" and insert therefor -- causal --;

Column 21, line 21: delete "casual" and insert therefor -- causal --;

Column 28, line 8: delete "presistent" and insert therefor -- persistent --;

Column 29, line 13: delete "knowledge" and insert therefor -- knowledges --;

Column 32, line 33-34: delete "disclosure" and insert therefor -- discourse --; and Column 32, line 52: delete "includes" and insert therefor -- include --.

Signed and Sealed this

Fifteenth Day of March, 1994

BRUCE LEHMAN

*Attest:*

*Attesting Officer*   *Commissioner of Patents and Trademarks*